Figure 2:
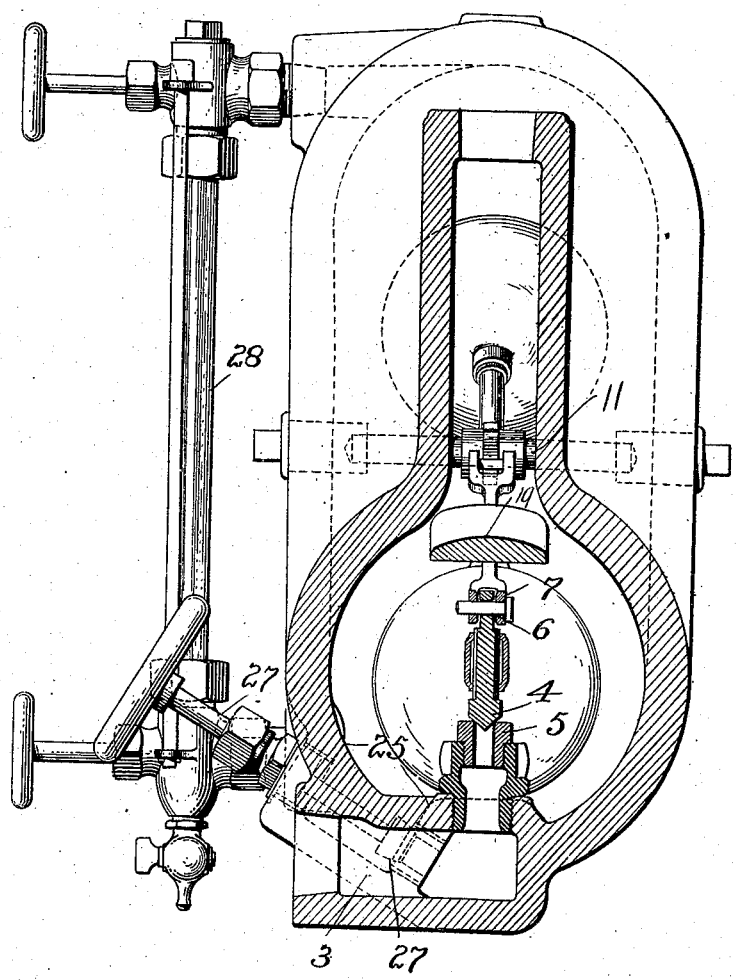

No. 854,911.
PATENTED MAY 28, 1907.
H. RITTER.
STEAM TRAP.
APPLICATION FILED JAN. 14, 1907.
2 SHEETS—SHEET 1.
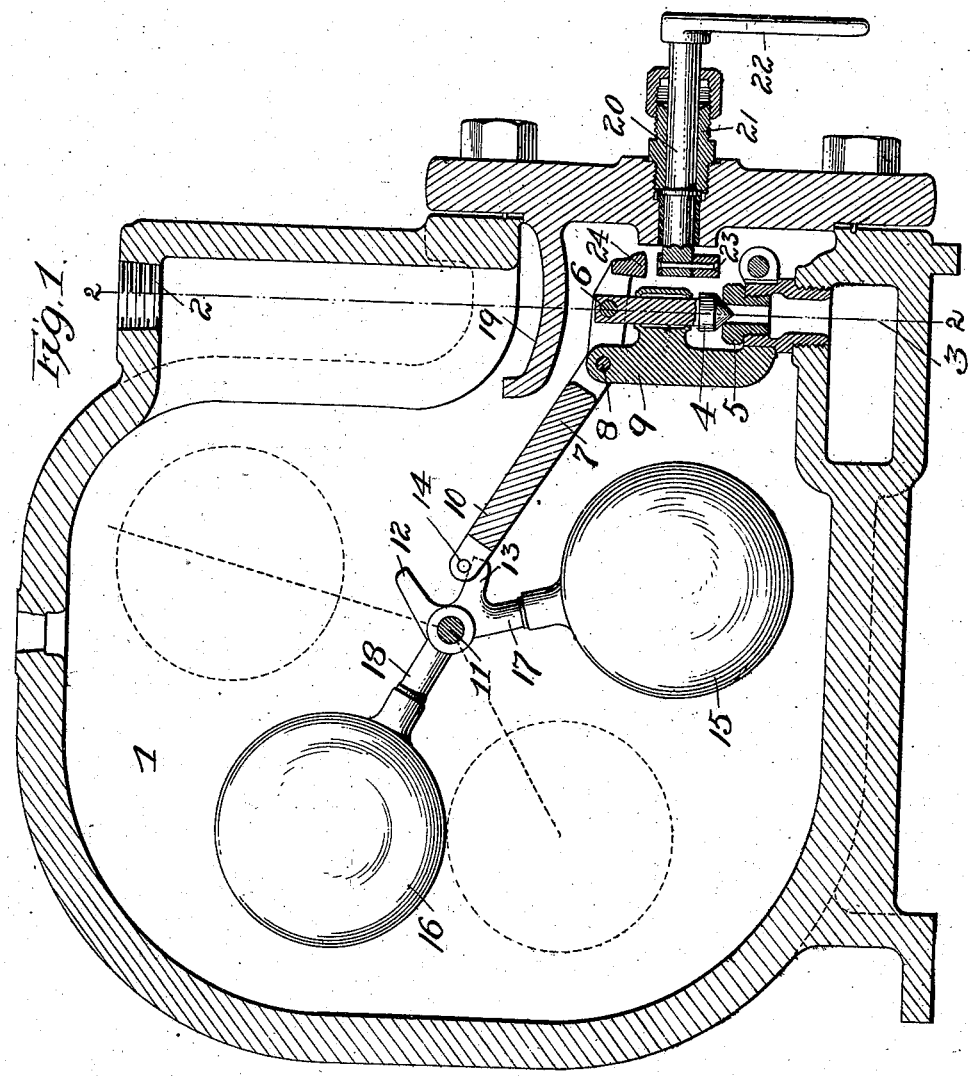
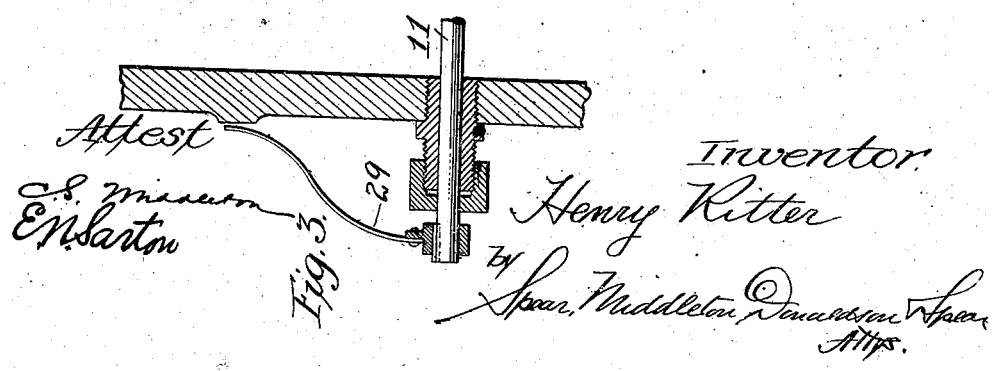

No. 854,911. PATENTED MAY 28, 1907.
H. RITTER.
STEAM TRAP.
APPLICATION FILED JAN. 14, 1907.

2 SHEETS—SHEET 2.

Attest
William Ayrne
E. N. Barton

Inventor
Henry Ritter
by Spear, Middleton, Donaldson & Spear
Attys.

UNITED STATES PATENT OFFICE.

HENRY RITTER, OF CINCINNATI, OHIO, ASSIGNOR TO THE LUNKENHEIMER CO., OF CINCINNATI, OHIO.

STEAM-TRAP.

No. 854,911.  Specification of Letters Patent.  Patented May 28, 1907.

Application filed January 14, 1907. Serial No. 352,254.

*To all whom it may concern:*

Be it known that I, HENRY RITTER, a citizen of the United States, residing at Cincinnati, Ohio, have invented certain new and useful Improvements in Steam-Traps and the Like, of which the following is a specification.

My invention relates to valve mechanism for use in connection with steam traps and in like situations where it is desired to control the valve so as to open quickly when the water has reached the level within the trap for which the parts have been set to operate, the valve being held in this open position until the water has been discharged, when the closing action, like that of the opening movement, will take place quickly. This quick movement of the valve will prevent wiredrawing of the water and the consequent frictional wear on the valve which takes place when the closing or opening movement is performed by a gradual and comparatively slow movement.

In carrying out my invention I employ a float operated valve and I have provided a special construction and arrangement of float or buoyant means, the effective buoyancy of which is greater at one period of the filling of the trap than at others, so that when the water has reached a certain height the maximum buoyant power of the float will become effective with the result that the valve will be operated quickly.

The buoyant means employed by me comprises a plurality of balls or floats connected with a common shaft, or otherwise suitably connected together, and having such relative angular positions that at times one float will be in neutral position, or, if preferred in a position by its buoyancy to oppose the movement of the other float, until the latter by reason of the greater leverage exerted by it, under the action of the rising water, has turned the shaft so as to throw the first float from its neutral or opposing position into a position to augment the buoyant force of the active or effective float resulting in a quick action to throw the valve open at the moment the predetermined level of water in the trap has been reached. This angular relation of the floats about the common axis and the differential leverage exerted as a result thereof has the effect of maintaining the valve in its open position until the water has fallen in the trap when the lower ball will fall, it being then in position to exert its full leverage, and the upper ball will then be moved from its neutral or opposing position to the position at which its weight will be added to that of the lower ball to cause a quick throw of the parts in a direction opposite to that first mentioned, resulting in the closing of the valve by a rapid movement thereof.

The invention consists in the features, combination and arrangement of parts hereinafter described and particularly pointed out in the claims.

In the drawings, Figure 1 is a central vertical sectional view through a trap embodying my invention. Fig. 2 is a sectional view on line 2—2 of Fig. 1. Fig. 3 is a view of a detail modification.

In these drawings, 1 is the casing of the trap having an inlet 2 and outlet 3. The discharge of water through the outlet is controlled by a valve 4 resting upon a renewable valve seat 5. The stem of the valve is pivotally connected at 6 to a lever 7, which in turn is pivoted in ear 8 of a bracket 9 supported in any suitable manner on the interior of the casing. The arm 10 of the valve lever extends to near the center of the casing at which point a shaft 11 is journaled in bearings in the sides of the casing. This shaft carries fingers 12, 13 arranged in divergent relation to each other and adapted to strike upon opposite sides of a pin 14 carried by the arm 10 of the valve lever. Associated with their arms and moving in unison therewith are two floats or balls 15, 16. They are connected with the shaft through arms 17, 18, and their angular relation about the shaft is such that when the valve 4 is closed upon its seat and the trap is empty, or substantially so, the lower float or ball will lie in a position below the shaft 11 while the other float will be at the left of the shaft with its lower periphery near the horizontal plane of the axis about which the floats turn. The lower float will therefore be in neutral position in that it will not be affected by the rising water, or, more accurately speaking, in the arrangement illustrated, in which the lower float lies with its center at the right of the vertical plane of the shaft or axis of the floats, the buoyancy of this float under the action of the rising water will be in opposition to that of the upper float 16 and the result will be that the valve will remain closed until the predetermined level of water has been reached and the water becomes effective in lifting the upper float. This upper float, it will be observed, is in position to be acted on and respond to the pressure of the water to substantially the maximum degree, or in other words it is in position to exert its leverage to practically its fullest extent and thus it will rise and will throw the lower float from its neutral position, or in the case illustrated, from its opposing position to a position, at the left of the vertical plane of the axis about which the floats turn. Immediately this takes place the buoyancy of the lower float is added to that of the upper float and, in consequence, the floats will turn rapidly about the central axis, bringing the arm 12 suddenly against the pin on the valve lever and throwing this lever with a rapid movement to open the valve.

In the action above described the upper float will be thrown to a point at the right of the vertical plane of the central axis 11 in which position it will tend by its weight to keep the valve open, and this relation of the parts will be maintained until the water falls in the trap, to the lower level determined upon, when the weight of the lower float, the latter now being in position to exert a greater leverage in respect to the upper float, will turn the floats and move the upper float to the left of the vertical plane of the axis 11, whereupon its weight will be added to that of the lower float to close the valve rapidly.

It will be seen from the above that my invention is carried out in a most simple manner, by employing a pair of floats, at different elevations within the casing connected to each other and having a connection common to them both for operating the valve. The operation of the parts while taking place rapidly is without shock as reliance is had entirely upon the floats as distinguished from weights, and consequently floats of comparatively small size may be employed, for the reason that the moment the valve is to be closed or opened, the buoyancy of one float, or its weight, as the case may be, supplements that of the other float.

Having now described the main feature of my invention, I will next refer to subordinate features of my trap. In Fig. 1 I show at 19 a shield extending over the valve to prevent the discharge of water directly upon the same which causes the accumulation of sediment on and around the valve. I provide means for operating the discharge valve by hand consisting of a shaft 20 extending through a stuffing box 21 and having a hand lever 22 on its outer end and a cam 23 upon its inner end which latter is arranged to contact with the end 24 of the valve lever, when the shaft is turned, to open the valve. I also provide a by-pass outlet for the water, this consisting of the port 25 leading from the interior of the casing to the discharge chamber 3 and for controlling this by-pass outlet a hand operated valve 27 is employed. A water-gage glass is shown at 28 in connection with the trap, or as shown in Fig. 3 the height of water within the trap may be indicated by an index finger 29 on the shaft 11 of the floats.

I claim as my invention:—

1. In combination in a trap, a casing, a shaft, a pair of floats arranged in different angular positions about the shaft, said floats being rigidly connected together to move in unison, a valve and means for operating the valve including separated contact members connected with the shaft, said separated contact members effecting the operation of the valve after the floats have acquired a certain momentum, substantially as described.

2. In combination in a trap, a casing, a pair of floats arranged in different angular positions about a shaft, said floats being rigidly connected together to move in unison, a valve, a lever adapted to close or open said valve, said lever being operated by separated contact members after the floats have acquired a certain momentum, substantially as described.

3. In combination in a trap, a casing, a valve, a pair of floats, a shaft common to the floats, said floats being disposed in different angular positions about the shaft, and when in the lowest position with one substantially below the shaft and the other to one side thereof, and when in highest position with the upper float across the vertical plane of the axis of the shaft, substantially as described.

4. In combination in a trap, a casing, a valve, a pair of floats, a shaft common to the two, a lever arm between the shaft and the valve, said floats being disposed in different angular positions about the shaft and when in the lowest position with one substantially below the shaft and the other to one side thereof, and when in highest position with the upper float across the vertical plane of the axis of the shaft, substantially as described.

5. In combination in a trap, a casing, a valve, a pair of floats disposed in different angular positions about a common axis and connected thereto, a pair of divergent arms at said axis, a pivoted lever connected to the valve and with its ends adjacent the axis of the floats, the said divergent arms operating the lever after the floats have moved through a certain arc, substantially as described.

6. In combination in a trap, a casing, a valve, a pair of rigidly connected floats, an axis common to them both, said floats being arranged in different angular positions about the said axis whereby one is in substantially neutral or opposing position and when moved by the other float augments the operating force thereof, a lever connection between the floats and the valve, having an extended end 24 and means for operating said lever by hand comprising a rock shaft extending through the casing and an arm on the inner end of the shaft engaging the extended end of the said lever, substantially as described.

7. In combination in a trap, a pair of floats, a valve, a common axis about which the floats turn, a connection between the floats and the said axis, one of the floats when the water is at its lowest level being located in neutral or opposing position below the said axis and the other float being in an elevated position so that while the water is rising in the trap to the upper float both floats will remain stationary, and a connection between the floats and the valve, substantially as described.

In testimony whereof, I affix my signature in presence of two witnesses.

HENRY RITTER.

Witnesses:
  GEO. K. ELLIOTT,
  CHAS. C. WURSTER.